United States Patent [19]

Studer et al.

[11] Patent Number: 5,667,696

[45] Date of Patent: Sep. 16, 1997

[54] METHOD FOR TREATMENT AND DISPOSAL OF LEAD BASED PAINT

[75] Inventors: Michael Kell Studer, Flower Mound; Philip J. Pisani, Irving, both of Tex.

[73] Assignee: Entact, Inc., Irving, Tex.

[21] Appl. No.: 614,960

[22] Filed: Mar. 11, 1996

[51] Int. Cl.[6] .................................................. C02F 1/62
[52] U.S. Cl. ............................................ 210/702; 210/912
[58] Field of Search .................................. 210/702, 751, 210/912

[56] References Cited

U.S. PATENT DOCUMENTS

| | | |
|---|---|---|
| 4,112,191 | 9/1978 | Anderson . |
| 4,254,055 | 3/1981 | Hyer et al. . |
| 4,305,853 | 12/1981 | Kronstein et al. . |
| 4,671,882 | 6/1987 | Douglas et al. .................. 210/720 |
| 5,234,470 | 8/1993 | Lynn et al. . |
| 5,245,120 | 9/1993 | Srinivasachar et al. . |
| 5,256,703 | 10/1993 | Hermann et al. . |
| 5,267,382 | 12/1993 | Aulson et al. . |
| 5,287,589 | 2/1994 | Hughes . |
| 5,344,472 | 9/1994 | Lynn et al. . |
| 5,365,013 | 11/1994 | Aulson . |
| 5,439,527 | 8/1995 | Rapp et al. ......................... 134/7 |

Primary Examiner—Neil McCarthy
Attorney, Agent, or Firm—Warren & Perez

[57] ABSTRACT

This invention relates to the treatment of lead based paint mixtures by treating the lead based paint mixture with an additive from the group consisting of phosphoric acid, monocalcium phosphate, monoammonium phosphate and diammonium phosphate, either alone or in combination with Portland Cement.

8 Claims, 2 Drawing Sheets

Leachable Lead vs. Leachate pH
Portland Cement Blends

- ■ TCLP
- □ Mod. TCLP-low pH
- ◆ Mod. TCLP-high pH
- ○ SPLP (1312)
- ▲ Dist. water

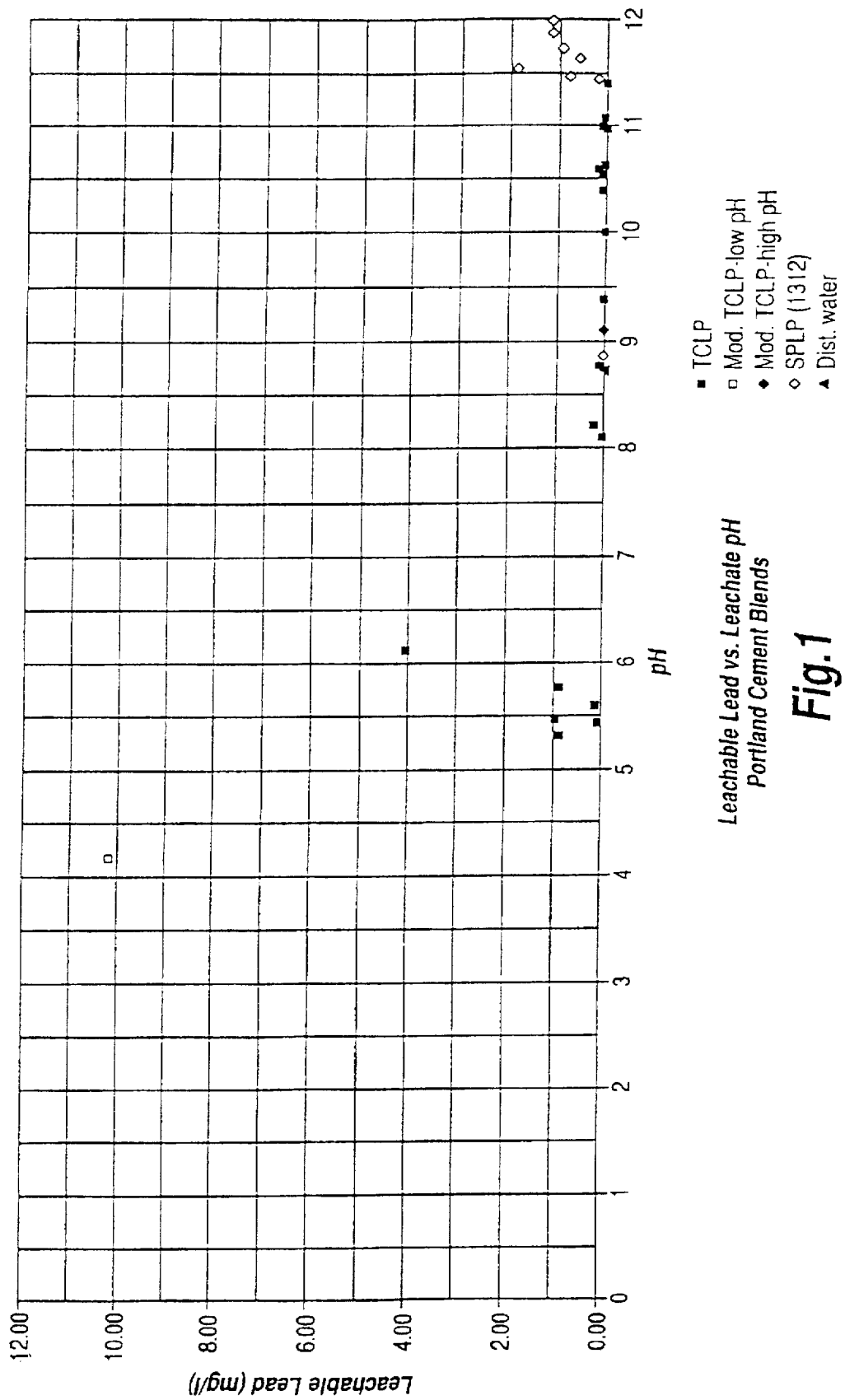

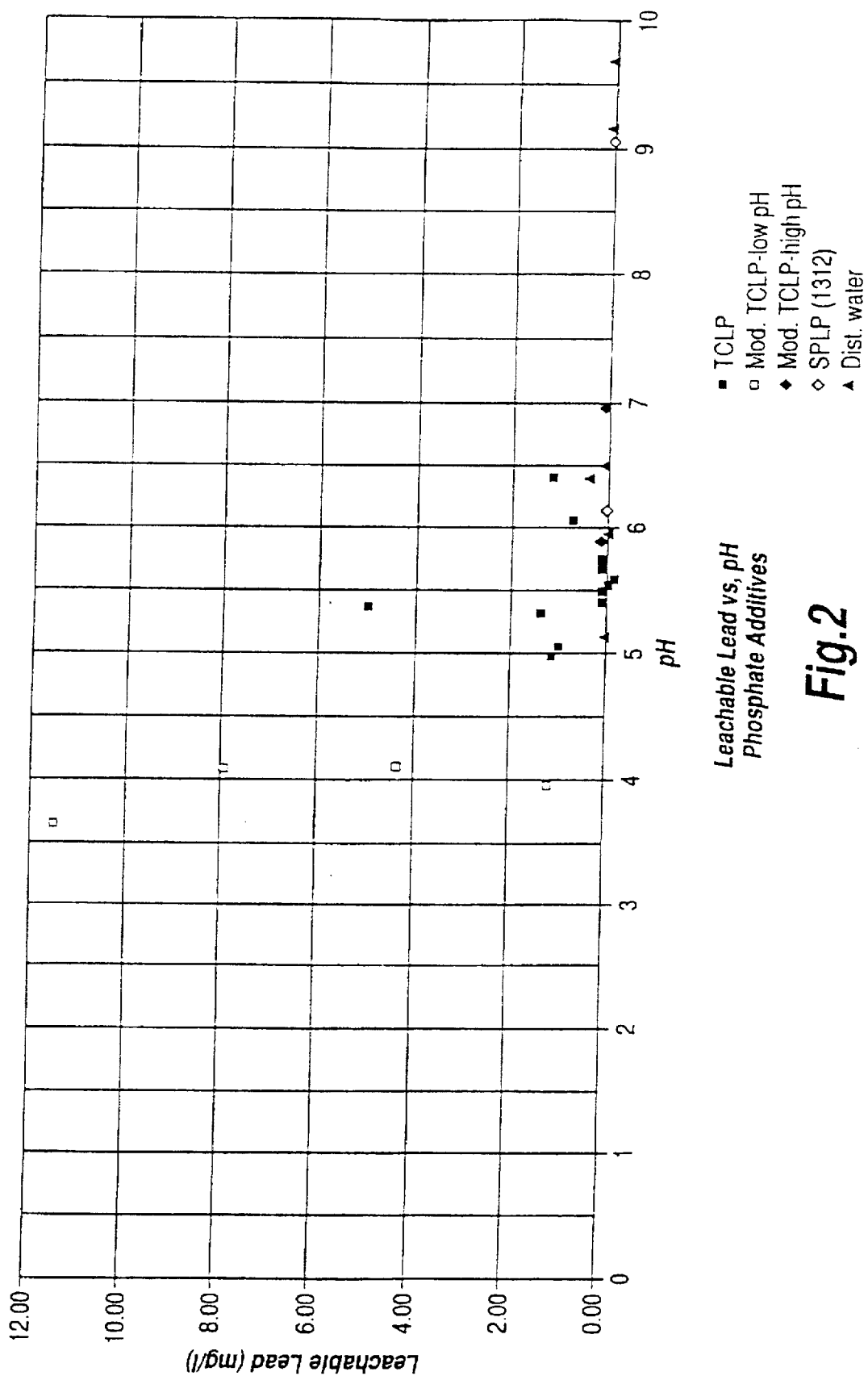

METHOD FOR TREATMENT AND DISPOSAL OF LEAD BASED PAINT

TECHNICAL FIELD

This invention relates to the treatment of contaminated materials, including soils, solids and lead based paints and, in particular, to chemical treatment of lead based paint to control leaching of the lead such that the lead will not leach at unacceptable levels into soil, ground water or other media (air)under naturally occurring conditions.

BACKGROUND OF THE INVENTION

Over the past fifteen to twenty years, the potential dangers of hazardous waste, in general, and lead, in particular, have been the subject of community pressure, public awareness and ever stricter regulatory control in order to reduce or eliminate the dangers to people directly and to the surrounding environment and other media such as soil and air.

The leaching of lead into ground water is a grave concern because of the danger that the drinking water supplies and the environment will become contaminated. In addition, the danger of long term exposure to lead based paints in homes and buildings to the central nervous system of individuals and children, in particular, has now been well-documented.

40 C.F.R., Part 261.24(a), contains a list of contaminants and their associated maximum allowable concentrations. If a contaminant (such as lead) exceeds its maximum allowable concentration, then the material is classified as hazardous. In general, the toxicity characteristic leaching procedure ("TCLP") test determines whether a solid waste has unacceptable levels of certain hazardous substances such as lead which can be leached from the solid waste.

Waste containing leachable lead (Pb) is currently classified as hazardous waste due to the toxicity characteristic, if the level of lead extracted in a TCLP analysis is above 5.0 milligrams per liter (mg/L) or parts per millions (ppm).

Additionally, U.S. EPA land disposal restrictions prohibit the land disposal of solid wastes which leach in excess of these maximum allowable concentrations upon performance of the TCLP analysis. The land disposal regulations require that these wastes are treated until the heavy metals do not leach from the solid waste at levels above the maximum allowable concentrations prior to placement in a surface impoundment, waste pile, landfill or other land disposal unit as defined in 40 C.F.R. 260.10.

Furthermore, lead paint has been prohibited from residential and commercial buildings for a number of years. Rental apartments may not be rented to tenants without the elimination of lead paint from lower woodwork accessible to children. States have been unanimous across the country, in passing laws requiring the de-leading of rental property.

Property owners and banks which have taken over property under foreclosure are under a tremendous strain to clean up their properties.

Typically, only 25 micrograms of lead per deciliter of blood can affect the mental capacities of young children and can result in grave behavioral and physical problems. Incredibly, 52%, or about 42 million of the nations' households still have layers of lead based paint on their woodwork.

Lead is highly toxic, even in minute quantities. Once it is ingested, lead enters the bloodstream where it inhibits the production of hemoglobin which red blood cells need to carry oxygen. Lead also locks out essential enzymes in the brain and central nervous system to inactivate them. Symptoms of lead poisoning include abdominal pains, muscular weakness and fatigue, while severe exposure may cause nervous system disorders, high blood pressure and even death.

Young children are most vulnerable because their nervous systems and brains are still developing. Lead can be removed from humans by a process called chelation, using drugs that bind to the metal in the bloodstream and flush it out in the urine, if treatment is begun before too much damage is done.

However, medical treatment is no substitute for a safe environment. The Health and Human Services Agency plan calls for: (1) surveillance of children with elevated levels of lead in their blood; (2) elimination of leaded paint and contaminated dust in housing; (3) reduction of children's exposure to lead in food, air, soil and water; and (4) an increase in community programs for the prevention of childhood lead poisoning. Eliminating lead from all pre-1950 housing would save as much as $28 billion in medical expenses and other costs, but at an expense of about $10 billion to put this plan into effect over the next 10 years.

This combination of criteria for the removal and treatment of lead based paint and proper disposal of the resultant hazardous waste can pose a significant challenge for developing a specific treatment for a particular solid waste that will meet both the regulatory and disposal criteria. The present invention meets this dual role of treating a lead based paint waste so that it may be safely disposed of in a landfill.

For example, the traditional soil amendments which have been used for many physical requirements, i.e., lime or lime-based products such as Portland Cement, are high alkaline. While such solid waste may meet the TC criteria when measured using the buffered acidic TCLP leachate solution, amphoteric substances such as lead may leach significantly if disposed of under more neutral conditions.

Nor have prior art additives and mixtures been used to treat lead based paints. Unlike the present invention, prior art additives and mixtures for reducing the leachability of lead have been unable to obtain these results with either the use of one additive only or with its combination with Portland Cement.

U.S. Pat. No. 5,202,033 describes an insitu method of decreasing heavy metal leaching from solid waste using a combination of solid waste additives and additional pH controlling agents from the source of phosphate, carbonate, and sulfates.

U.S. Pat. No. 5,037,479 discloses a method for treating highly hazardous waste containing unacceptable levels of leachable metals such as lead by mixing the solid waste with a buffering agent selected from the group consisting of magnesium oxide, magnesium hydroxide, reactive calcium carbonates and reactive magnesium carbonates with an additional agent which is either an acid or salt containing an anion from the group consisting of Triple Superphosphate (TSP), ammonium phosphate, diammonium phosphate, phosphoric acid, boric acid and metallic iron.

U.S. Pat. No. 4,889,640 discloses a method and mixture for treating hazardous waste, including lead, by mixing the solid waste with an agent selected from the group consisting of reactive calcium carbonate, reactive magnesium carbonate and reactive calcium magnesium carbonate.

U.S. Pat. No. 4,652,381 discloses a process for treating industrial waste water contaminated with battery plant waste, such as sulfuric acid and heavy metals by treating the waste water with calcium carbonate, calcium sulfate, calcium hydroxide to complete a separation of the heavy metals. However, this is not for use in a landfill situation.

Various prior methods have also been used to detoxify, but not dispose of, lead based paint waste.

For example, U.S. Pat. No. 4,112,191 discloses metal salts of dithiocarbamates as effective precipitants for lead ions that can be included in a digestible coating which is applied over lead based paints to effectively detoxify the lead paint.

U.S. Pat. No. 4,305,853 discloses a process of chemically modifying metal oxides, such as lead oxide, by treating them under heat with a Lecithin material so that the metal oxides may obtain new and desirable properties.

U.S. Pat. No. 5,234,470 discloses a media for use in treating a surface to remove undesired contaminants, such as paint, that can be used to remove lead paint softened by conventional strippers.

U.S. Pat. No. 5,365,013 discloses a unit for the removal and disposal of lead painted woodwaste.

Unlike the present invention, however, none of the prior art solutions are able to utilize the lead based waste itself in combination with a single additive, either alone or with Portland Cement, to safely dispose of a lead based paint by producing a non-toxic landfill substance as defined by the TCLP.

SUMMARY OF THE INVENTION

Treatment of a solid waste containing a lead based paint may be accomplished by addition of a substance which provides an anion with which the lead reacts to form a relatively insoluble species, e.g. a salt, and provides assurance that the proper pH range is maintained for passing the TCLP analysis and allows minimal leaching under actual disposal conditions.

The present invention discloses a treatment of lead based paint waste through the addition of one additive substance, either alone or with Portland Cement, properly chosen to complement the waste constituency and, therefore, provide the appropriate chemical equilibrium needed to maintain the proper pH range. The present invention involves the treatment of hazardous and solid waste by the addition and mixing with one or more treatment additives chosen and tailored with consideration given to the chemical and physical regulatory criteria, soil and ground water chemistry of the disposal site, and the chemistry of the waste itself, in particular, pH.

Indeed, the present invention provides a method for the treatment of lead based paint with one or the following additives: (1) phosphoric acid, (2) monocalcium phosphate (TSP), (3) monoammonium phosphate or (4) diammonium phosphate, either alone or in a combination with Portland Cement.

Any of these additives provide the following two important components to the waste mixture: (1) the phosphate ion which reacts with the lead to form a salt which is insoluble, and (2) the phosphoric acid buffer system which provides stability for the treated waste mixture under minor environmental changes.

BRIEF DESCRIPTION OF THE DRAWINGS

Other features and advantages of the invention will be apparent from the following detailed description of the invention when taken in conjunction with the following detailed description.

FIG. 1 is a graph of the leachable lead versus pH using a Portland Cement blend of the present invention; and FIG. 2 is a graph of the leachable lead versus pH using the additives of the present invention.

DETAILED DESCRIPTION

The present invention involves the treatment of a lead based paint solid waste by the addition and mixing with one or more treatment additives chosen by considering (1) the chemical and physical regulatory criteria; (2) the soil and ground water chemistry of the disposal site; and (3) the chemistry of the waste itself, in particular, its pH.

Depending on the pH of the waste itself, one of the following additives may be used alone or with Portland Cement to treat the waste: (1) phosphoric acid, (2) monocalcium phosphate, also commonly available in a fertilizer grade as triple super phosphate or TSP, (3) monoammonium phosphate, or (4) diammonium phosphate. Any of the above particular additives provide the two necessary components for the waste mixture. One component is the phosphate ion which reacts with the metal and, in particular, lead to form a salt or minieral which is insoluble under normal environmental conditions, and (2) a phosphoric acid buffer system that provides stability to the treated waste mixture under minor environmental changes.

A buffer solution is one consisting of a weak acid and its conjugate base which resists pH changes when diluted or when varous amounts of acid or base are added. Since orthophosphoric acid (hereinafter referred to as phosphoric acid), the root compound of the above-listed additives, is a polyprotic acid, it disassociates or ionizes in three steps involving the following-protontransfer equilibria:

(1) $H_3PO_4 + H_2O \rightleftharpoons H_2PO_4^- + H_3O^+$  $K_1$ $7.5 \times 10^{-3}$ $pK_1 = 2.1$
(2) $H_2PO_4^- + H_2O \rightleftharpoons HPO_4^{2-} + H_3O^+$  $K_2$ $6.3 \times 10^{-8}$ $pK_2 = 7.2$
(3) $HPO_4^{2-} + H_2O \rightleftharpoons PO_4^{3-} + H_3O^+$  $K_3$ $4.8 \times 10^{-18}$ $pK_3 = 12.3$ In each of these ionization steps, the substance on the left side of the reaction arrow is the weak acid and the substance on the right is the conjugate base. Therefore, three separate buffer systems are available by the addition of phosphoric acid or of its derivative salts in an aqueous solution.

The chemical equilibria shifts with pH and the addition of other chemical species. In a pure phosphoric acid solution, however, at a pH of 4.6, the $H_2PO_4^-$ species totally dominates. At a pH of 7.2, the equilibrium shifts to ½ $H_2PO_4^-$ and ½ $HPO_4^{2-}$ and at a pH of 9.8, the species $H_2PO_4^-$ dominates. The maximum buffer capacity exists at the pH where equal concentrations of each species exists, or the pK value is 2.1 for reaction (1), 7.2 for reaction (2) and 12.3 for reaction (3).

Lead is known to be soluble at lower and higher pH ranges, therefore, theoretically the optimum pH of a phosphoric acid solution with lead would be 7.2. The chemical equilibria of such a system, however, is subject to many additional factors; therefore, the optimum final pH shifts with every mixture. Tables 1 through 8 show the compilation of leachable lead data obtained in several treatability studies from varous waste sites. The solid waste samples tabulated in tables 2 and 3 are from secondary lead smelter residues having a relatively high pH.

Tables 1 through 8 show successful treatment of lead contaminated solid wastes including lead based paint by the additon of several phosphate additives by themselves and with the addition of Portland Cement added for soil stability. The Portland Cement used is preferrably as specified by ASTM C150. The data in Tables 1–8 also show the successful treatment of lead contaminated solid wastes by the addition of a single phosphate additive from the group consisting of phosphoric acid, monoammonium phosphate, calcium phosphate or TSP, either alone or in combination with Portland Cement used as a soil stabilizer.

Thus, in determining the soil physical and chemical characteristics and the proper additive for treatment of the solid waste, samples of the solid waste are used to perform the laboratory treatment tests. For example, in practicing the invention, the mix of the solid waste containing a lead based paint waste with the pH buffering agents must be sufficiently complete so that a random small sample, e.g. 100 grams of the waste mixture, will have sufficient agents to limit lead extraction to below 5.0 mg/l when the waste mixture is analyzed using the TCLP. For a specific solid waste, the appropriate ratio of agents to solid waste may be arrived at by experimentation with 100 gram samples of the waste having various percentages of the agents by weight as set forth in Tables 1–8. In general, the percentage by weight of additives can range from 1% to 10% and the percentage by weight of the Portland Cement additive can range from 3% to 30%.

FIGS. 1 and 2 disclose the pH versus leachable lead content of the treated mixtures and indicate that once the orthophosphate system is introduced to the mixture, lead remains relatively insoluble in the pH range between 5.5 and 11.5. Thus, the final optimum pH which provides the maximum buffer for the solid wastes is likely between 7 and 10 and will usually be the design pH range for treatment of solid wastes containing lead.

TABLE 1

| Sample | TCLP pH | TCLP Lead |
|---|---|---|
| Sample A - Untreated | 5.59 | 159.00 |
| A + 1% Phosphoric Acid | 5.37 | 5.00 |
| A + 0.5% Phos. Acid + 5% Portland Cement | 5.05 | 376.00 |
| A + 1% Phos. Acid + 5% Portland Cement | 4.98 | 104.60 |
| A + 0.5% Phos. Acid + 10% Portland Cement | 5.24 | 26.10 |
| A + 1% Phos. Acid + 10% Portland Cement | 6.12 | 4.00 |
| A + 1% Phos. Acid + 12% Portland Cement | 8.2 | 0.20 |
| A + 1% Phos. Acid + 20% Portland Cement | 10.39 | 0.08 |
| A + 1% Monoammonium Phosphate | 5.6 | 67.70 |
| A + 1% Calcium Phosphate Monobasic (TSP) | 5.47 | 78.40 |
| A + 3% TSP + 5% Portland Cement | 4.87 | 10.80 |
| A + 3% TSP + 10% Portland Cement | 5.76 | 0.88 |
| A + 3% TSP + 20% Portland Cement | 11. | 0.09 |

The data from Table 1 discloses that acceptable TCLP lead measurements are reached when the lead based paint solid waste is mixed with one of the additives chosen from the group consisting of phosphoric acid and TSP when mixed with Portland Cement. The percentage of phosphoric acid preferably is 1 percent by weight or greater and the percentage of Portland Cement is preferably ten percent by weight or greater. The percentage of TSP is preferably three percent by weight or greater.

TABLE 2

| Sample | TCLP pH | TCLP Lead |
|---|---|---|
| Sample B - Untreated | 5.54 | 814.40 |
| B + 1% Phos. Acid | 6.4 | 1.13 |
| B + 1% Phos. Acid + 5% Portland Cement | 10.01 | <0.05 |
| B + 1% Phos. Acid + 20% Portland Cement | 10.98 | <0.05 |
| B + 3% TSP | 6.06 | 0.71 |
| B + 3% TSP + 5% Portland Cement | 8.1 | <0.05 |
| B + 3% + 20% Portland Cement | 11.41 | <0.05 |

Table 2 discloses that the use of phosphoric acid, either alone or in combination with Portland Cement, results in acceptable TCLP lead characteristics. Table 2 also discloses the use of TSP (either alone or in combination with Portland Cement) achieves acceptable results. In Table 2, the percentage of phosphoric acid is preferably one percent by weight or greater and Portland Cement is 5% greater by weight or greater. The preferred TSP percentage is 3% by weight as shown in Table 2.

TABLE 3

| Sample | TCLP pH | TCLP Lead |
|---|---|---|
| Sample C - Untreated | 5.41 | 314.40 |
| C + 3% Monoammonium phosphate (M.am.) | 5.74 | 0.09 |
| C + 1.5% M.am. phos. + 1.5% sodium carbonate | 5.49 | 0.09 |
| C + 1.5% M.am. phos. + 1.5 Portland Cement | 5.43 | 0.05 |
| C + 3% TSP | 5.41 | 0.06 |
| C + 1.5% TSP + 1.5% sodium carbonate | 5.67 | 0.11 |
| C + 1.5% + 1.5% sodium carbonate | 5.59 | 0.11 |

Table 3 shows that solid waste mixtures containing (1) 3% percent by weight monoammonium phosphate, (2) 1 ½% by weight sodium carbonate and 1 ½% by weight monoammonium phosphate, (3) 3% by weight TSP (4) and (5) 1.5% by weight TSP and 1.5% by weight sodium carbonate are effective in treating solid wastes containing lead including lead based paint.

TABLE 4

| Sample | TCLP pH | TCLP lead |
|---|---|---|
| Sample D - Untreated | 5.41 | 110.50 |
| D + 3% M.am.phos. | 5.04 | 0.97 |
| D + 1.5% M.am. phos. + 1.5% sodium carbonate | 5.33 | 1.35 |
| D + 1.5% M.am. phos. + 1.5 Portland Cement | 5.32 | 0.86 |
| D + 3% TSP | 4.97 | 1.12 |
| D + 1.5% TSP + 1.5% sodium carbonate | 5.32 | 1.36 |
| D + 1.5% + 1.5% Portland Cement | 5.47 | 0.94 |

Table 4 illustrates, once again, the usefulness of the present invention and specifically discloses monoammonium phosphate, sodium carbonate and Portland Cement combinations that achieve acceptable lead leaching characteristics. Table 4 shows that the following additives prevent lead from leaching at unacceptable levels: (1) 3% by weight monoammonium phosphate, (2) 1.5% by weight monoammonium phosphate and 1.5% by weight sodium carbonate, (3) 1.5% by weight monoammonium phosphate and 1.5% by weight Portland Cement, (4) 3% by weight TSP, (5) 1.5% by weight TSP and 1.5% by weight sodium carbonate and (6) 1.5% by weight TSP and 1.5% by weight Portland Cement.

TABLE 5

| Sample | TCLP pH | TCLP Lead |
|---|---|---|
| A + 1% Phos. Acid + 10% Portland Cement | 6.12 | 4.00 |
| A + 1% Phos. Acid + 12% Portland Cement | 8.2 | 0.20 |
| A + 1% Phos. Acid + 20% Portland Cement | 10.39 | 0.08 |
| A + 3% Phos. Acid + 10% Portland Cement | 5.76 | 0.88 |
| A + 3% TSP Phos. Acid + 20% Portland Cement | 11 | 0.09 |

Table 5 discloses that the combinations of (1) phosphoric acid and Portland Cement and (2) TSP and Portland Cement are effective in treating lead containing solid wastes such as lead based paints.

TABLE 6

| Sample | TCLP pH | TCLP Lead |
|---|---|---|
| B + 1% Phos. Acid + 5% Portland Cement | 10.01 | 0.03 |
| B + 1% Phos. Acid + 20% Portland Cement | 10.98 | 0.03 |
| B + 3% TSP + 5% Portland Cement | 8.1 | 0.03 |
| B + 3% TSP × 20% Portland Cement | 11.41 | 0.03 |

Table 6 shows the effective treatment of lead containing solid wastes including lead based paint with (1) phosphoric acid and Portland Cement and 92) TSP and Portland Cement.

TABLE 7

| Sample | TCLP pH | TCLP Lead |
|---|---|---|
| C + 1.5% M.am.phos. + 1.5% Portland Cement | 5.43 | 0.05 |
| C + 1.5% TSP + 1.5% Portland Cement | 5.59 | 0.11 |

Table 7 shows the effective treatment of lead containing solid wastes including lead based paint with (1) monoammonium phosphate and Portland Cement and (2) TSP and Portland Cement.

TABLE 8

Treatment Data - Portland Cement and Phosphate Additives

| Sample | TCLP pH | TCLP Lead |
|---|---|---|
| D + 1.5% M.am.phos. + 1.5% Portland Cement | 5.32 | 0.86 |
| D + 1.5% TSP + 1.5% Portland Cement | 5.47 | 0.94 |

Table 8 shows the effective treatment of lead containing solid wastes including lead based paint with (1) monoammonium phosphate and Portland Cement and (2) TSP and Portland Cement.

The treatability ratios of Tables 1 through 8 disclose that agents of phosphoric acid, monoammonium phosphate, diamonium phosphate and TSP either alone or in combination with Portland Cement can be used to reduce extractable lead in solid waste including lead based paint to U.S. EPA acceptable criteria.

It is understood that the invention is not confined to the particular process disclosed herein; nor to the materials and substances described, but embraces such modified forms thereof as come within the scope of the following claims.

We claim:

1. A method of treating lead based paint waste, the method consisting essentially of the steps of mixing the lead based paint waste with at least one agent selected from the group consisting of phosphoric acid, monocalcium phosphate, monoammonium phosphate, and diammonium phosphate, in sufficient quantities such that the mixture will have an optimum pH range between 5.5 and 11.5 so that under both acidic and non-acidic leaching conditions the lead in the mixture will be converted to substantially non-leachable form.

2. The method of claim 1 wherein the lead based paint waste and agents are mixed into a mixture with sufficient quantities of each of the agents so that a random 100 gram sample of the mixture will have sufficient agents to limit leachable lead extraction below 5.0 mg/l when analyzed by the toxicity characteristic leaching procedure.

3. A non-hazardous lead based paint waste mixture which may be safely disposed in a landfill consisting essentially of a lead based paint waste containing unacceptable levels of leachable lead mixed with at least one agent selected from the group consisting of phosphoric acid, monocalcium phosphate, monoammonium phosphate, and diammonium phosphate in quantities sufficient such that the mixture will have an optimum pH range between 5.5 and 11.5 so that under both acidic and non-acidic leaching conditions the lead will be converted to a substantially non-leachable form.

4. The non-hazardous lead based paint waste mixture of claim 3 wherein there is a sufficient quantity of each of the agents incorporated into the mixture so that when a random 100 gram sample of the mixture is analyzed by the toxicity characteristic leaching procedure, leachable lead is extracted at a level below 5.0 mg/l.

5. A method of treating lead based paint waste containing unacceptable levels of leachable lead, the method comprising the step of mixing the lead based paint waste with at least one agent selected from the group consisting of phosphoric acid, monocalcium phosphate, monoammonium phosphate, and diammonium phosphate and mixed with the additional agent Portland Cement in sufficient quantities such that the mixture will have an optimum pH range between 5.5 and 11.5 so that under both acidic and non-acidic leaching conditions, the lead in the mixture will be converted to a substantially non-leachable form.

6. The method of claim 5 wherein the lead based paint waste and agents are mixed into a mixture with sufficient quantities of each of the agents so that a random 100 gram sample of the mixture will have sufficient agents to limit leachable lead extraction to below 5.0 mg/l when analyzed with the toxicity characteristic leaching procedure.

7. A non-hazardous lead based paint waste mixture which may be safely disposed of in a landfill comprising a lead based paint waste containing unacceptable levels of leachable lead mixed with at least one first agent selected from the group of phosphoric acid, monocalcium phosphate, monoammonium phosphate, and diammonium phosphate and mixed with the additional agent Portland Cement in quantities sufficient such that the mixture will have an optimum pH range between 5.5 and 11.5 so that under both acidic and non-acidic leaching conditions the lead will be converted to a substantially non-leachable form.

8. The non-hazardous lead based paint waste mixture in accordance with claim 7 wherein there is sufficient quantity of each of the agents incorporated into the mixture so that when a random 100 gram sample of the mixture is analyzed by the toxicity characteristic leaching procedure, leachable lead is extracted at a level below 5.0 mg/L.

* * * * *